Dec. 20, 1966     J. B. MERILA     3,292,400

AUTOMOBILE IGNITION KEY HOLDER

Filed July 6, 1964

INVENTOR.
John B. Merila
BY John A. Hamilton
Attorney.

United States Patent Office 3,292,400
Patented Dec. 20, 1966

3,292,400
AUTOMOBILE IGNITION KEY HOLDER
John B. Merila, 800 Armour Blvd.,
Kansas City, Mo. 64109
Filed July 6, 1964, Ser. No. 380,512
1 Claim. (Cl. 70—414)

This invention relates to new and useful improvements in key holders, and has particular reference to a key holder especially adapted for use with automobile ignition keys, having as its principal object the prevention of the unsafe practice of many motorists of leaving the key in the ignition lock when they leave their vehicles. It is well known to the general public that a large percentage of automobile thefts occur, and are rendered easy, by this practice of leaving the ignition keys in the cars. Police authorities, insurance companies, and other groups directly involved with automobile thefts conduct frequent campaigns discouraging the practice and warning of the danger thereof, but carelessness on the part of motorists of course continues. The present invention largely solves the problem by a provision of means whereby the key is automatically removed from the lock, and deposited in the motorist's hand, whenever said key is turned to its "off" position to shut off the automobile engine, so that said motorist is forcibly reminded to place the key in his pocket, and not to leave it in the car.

Another object is the provision of a device of the character described wherein the key itself, as well as the key-ejecting elements, are carried in a small holder or container which is neat and attractive in appearance, and small enough to be carried conveniently in the pocket, the key normally being completely enclosed and protected within the holder except when in actual usage.

A further object is the provision of a key holder of the character described which may easily be adapted to hold, and to provide for the automatic ejection of, two or more keys.

A still further object is the provision of a key holder of the character described which, while preferably utilizing a special key blank in place of a standard key, has provision for ready removal of the special blank from the holder to facilitate the cutting of the requisite notches therein to fit it for a particular lock. The holder could also be adapted to receive standard keys without alteration.

Other objects are simplicity and economy of construction, efficiency and dependability of operation, and adaptability for use with keys other than ignition keys, such as door keys.

Figure 1:
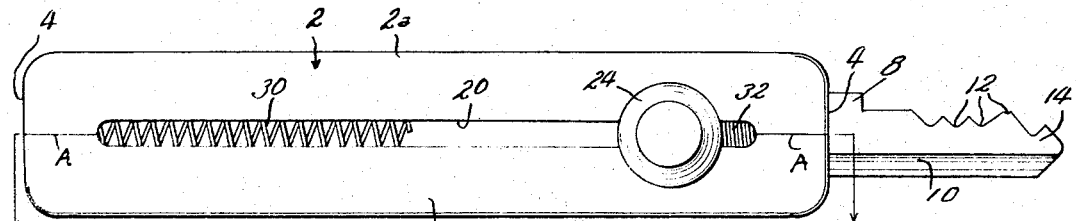
Figure 2:
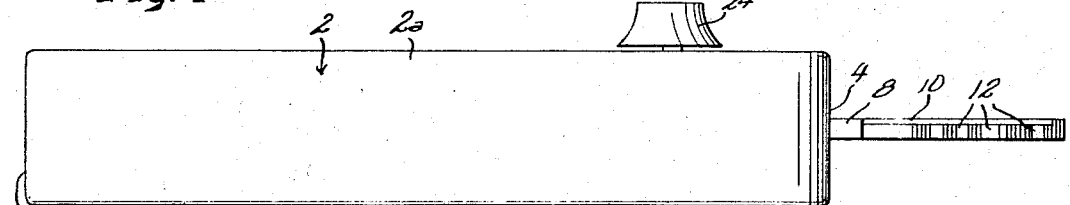
Figure 3:
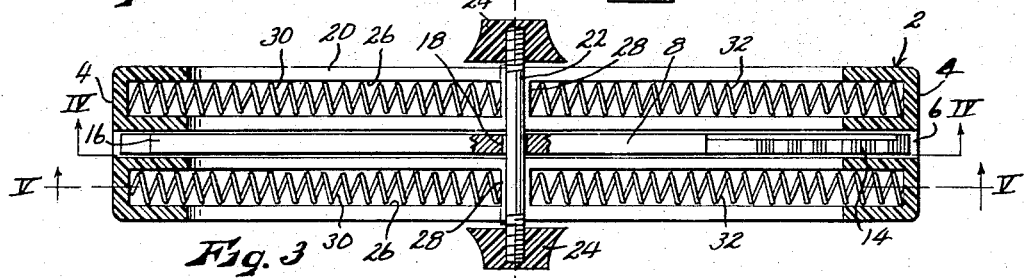
Figure 4:
Figure 5:
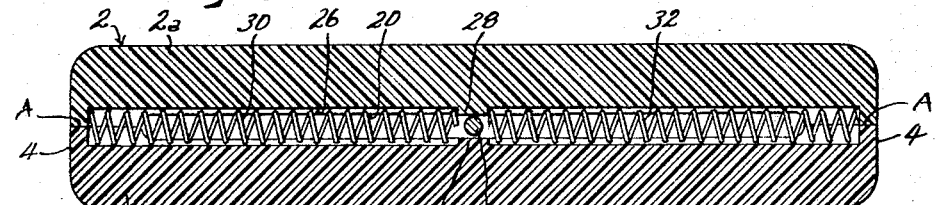
Figure 6:
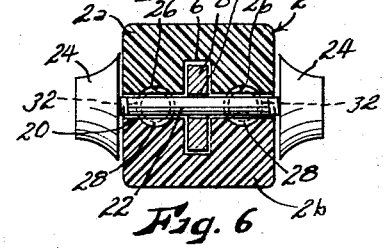

With these objects in view, as well as other objects which will appear in the course of the specification, reference will be had to the accompanying drawing, wherein:

FIG. 1 is a side elevational view of a key holder embodying the present invention, with one of the two keys held thereby extended therefrom for use, FIG. 2 is a top plan view of the holder as shown in FIG. 1, FIG. 3 is a sectional view taken on line III—III of FIG. 1, with both of the keys retracted within the holder, parts being left in elevation and partially broken away, FIG. 4 is a sectional view taken on line IV—IV of FIG. 3, FIG. 5 is a sectional view taken on line V—V of FIG. 3, with parts left in elevation, and FIG. 6 is a sectional view taken on line VI—VI of FIG. 3, with parts left in elevation.

Like reference numerals apply to similar parts throughout the several views, and the numeral 2 applies to the body member of the holder, said body member being shown about twice normal size, and being of elongated form with a rectangular cross-sectional contour. It is preferably formed of a rigid plastic, though other suitable materials could be used. Each end surface 4 thereof forms a planar abutment for a purpose which will presently appear, and is sufficiently small in area to engage the face of a pin tumbler lock such as is commonly used in automobile ignitions, as well as for many other purposes, without interference from the dashboard or other elements disposed nearby. A hole 6 is formed longitudinally through the body member so as to open through the end abutment surfaces 4 thereof, and is of flat, rectangular cross-sectional shape, whereby to receive a key blank 8 of similar cross-sectional shape slidably therein as shown. Each end of said blank has longitudinal grooves 10 and transverse notches 12 formed therein, whereby to form a common pin tumbler key. Each end of the blank thus constitutes a separate key, said keys being designated respectively by the numerals 14 and 16. The total length of the key blank is somewhat less than the length of body member 2, so that both of keys 14 and 16 may be disposed entirely within said body member. Midway between the ends of the key blank, a hole 18 is formed therethrough, the axis of said hole being transverse to the body member and to the major cross-sectional axis of the key blank.

A slot 20 is formed through the body member transversely to the major cross-sectional axis of the key blank, opening through the sides of the body member and extending from a point adjacent one end to a point adjacent the opposite end of said body member. Said slot intersects the hole 6 in which key blank 8 is mounted. An operating pin 22 extends through slot 20 transversely of the body member, passing through hole 18 of the key blank, and has a knob 24 threaded removably on each end thereof, externally of the body member. Thus, by grasping knobs 24 and moving them selectively toward either end of the body member, either key 14 or key 16 may be extended longitudinally from the body member. Key 14 is shown so extended in FIGS. 1 and 2.

At either side of key blank 8, a longitudinal cylindrical recess 26 is formed in body member 2, in parallel relation to key blank hole 6, said recesses lying in the plane of, and being intersected by slot 20. Said recesses extend substantially the full length of the body member, but are closed at their ends. Also, each of said recesses is divided at its midpoint by a stop consisting of a partition wall 28 of slightly greater thickness than the diameter of operating pin 22. Each of recesses 26 has a pair of helical compression springs 30 and 32 disposed coaxially therein, each spring normally bearing at one end against stop 28 adjacent pin 22, and at its opposite end against a closed end of the recess 26 in which it is disposed. Springs 30 are disposed at opposite sides of key portion 16 of blank 8, and springs 32 are disposed at opposite sides of key portion 14 of blank 8.

In operation, it will be seen that springs 30 and 32 normally retain operating pin 22 in alignment with partition wall 28, whereby to retain keys 14 and 16 retracted entirely within body member 2. When it is desired to use either key, for example key 14, knobs 24 are grasped and moved toward the right end of the body member, as viewed in the drawing, whereby to project key 14 from the body member, as in FIGS. 1 and 2. Simultaneously, pin 22 engages and compresses springs 32. Key 14 is then inserted in the ignition lock and turned to energize the automobile ignition system. The body member is then released, whereupon springs 32 urge the end abutment surface 4 of the body member 2 against the face of the lock with considerable force. However, this does not pull the key out of the lock at this time, since the key, having been turned, is secured against removal by the engagement of the tumbler bolts of the lock, not shown, in the notches 12 of the key, as is well understood in the art. Whenever the key is then returned to its "off" position to shut off the automobile engine, the key is released to be withdrawn from the lock, and is immediately and automatically withdrawn from the lock, and into the body member, by springs 32. If key 16 is being used, the action is of course identical except that springs 30 then come into play. Since the motorist grasps the key to turn it to its "off" position, the resultant automatic withdrawal of the key from the lock, as just described, leaves the key and holder free in his hand, and he is thereby forcibly reminded that he should take it with him when he leaves the vehicle.

The use of two springs in connection with each key, disposed at transversely opposite sides of the key, provides a balanced, direct pull on the key in extracting the key from the lock, thereby reducing the possibility that said key might be canted angularly in the lock in a jammed condition, and not be pulled free. Partition wall 28, which normally spaces the contiguous ends of each spring pair 30–32 apart, permits easy assembly. As shown, body member 2 is divided into identical halves 2a and 2b in the plane of slot 20, along the line A—A, said halves then being permanently bonded together with springs 30 and 32 already inserted. Key blank 8 may be removed by unscrewing one of knobs 24 and removing pin 22, for the cutting of notches 12 therein, and then reinserted by reversing the procedure, partition walls 28 separating the springs to permit insertion of pin 22 without interference.

While body member 2 is sufficiently small to be carried conveniently in a pocket, even though as shown it carries two keys in end-to-end relation, it will be readily apparent that it could be made little more than half its present length by incorporating only one key therein. Also, while as shown the device requires a special key blank, it will be readily apparent that standard keys could be used if the interior dimensions of the body member were enlarged to accommodate the enlarged head of a standard key, pin 22 then being inserted through the holes nearly universally provided in the key heads. It is considered that these as well as many other minor changes of the structure and operation could be made without departing from the spirit of the invention as defined by the scope of the appended claim.

What I claim as new and desire to protect by Letters Patent is:

In combination:
(a) a key for a pin tumbler lock,
(b) a holder for said key including an elongated body member having an external end abutment surface adapted to engage the face of a pin tumbler lock, said body member being hollow and containing said key, said key being longitudinally movable in said body member from a retracted position entirely within said body member to an extended position projecting outwardly from said body member through an aperture of said body member formed in said abutment surface,
(c) an elongated rigid operating member engaged loosely and slidably in a hole formed therefor in said key within said body member, whereby to be easily removable therefrom to permit separation of said key from said body member, said operating member extending laterally of said key with both ends thereof extending outwardly from said body member through slots of said body member elongated longitudinally of said key, whereby said key may be manually moved between said retracted and extended positions,
(d) a pair of enlarged knobs secured respectively to the opposite extended ends of said operating member, whereby to secure said body member, key and operating member in assembly, at least one of said knobs being detachable from said operating member to permit disassembly of said parts, and
(e) a compression spring disposed in said body member in parallel relation to said key and lying in the path of said operating member as it moves said key from its retracted position to its extended position, said spring being retained between a pair of fixed stops of said body member when said operating member is in its key-retracting position, whereby said operating member is relieved of the pressure of said spring to permit easy insertion and removal of said operating member, but is engaged and compressed by said operating member as the latter initiates its key-extending movement, whereby said spring biases said key toward its retracted position.

References Cited by the Examiner

UNITED STATES PATENTS

| | | | |
|---|---|---|---|
| 2,505,987 | 5/1950 | Mullan | 70—414 |
| 2,509,318 | 5/1950 | Segui | 70—456 |
| 2,600,749 | 6/1952 | Gallagher | 70—456 |

FOREIGN PATENTS 716,277  9/1954  Great Britain.

EDWARD C. ALLEN, *Primary Examiner.*

P. TEITELBAUM, *Assistant Examiner.*